United States Patent [19]
Lee et al.

[11] Patent Number: 5,580,652
[45] Date of Patent: Dec. 3, 1996

[54] BIAXIALLY ORIENTED POLYESTER FILM CONTAINING AN ALUMINUM HYDRATE

[75] Inventors: Young-Jin Lee, Anyang-si; Kwang-Hyung Lee, Suwon-si; Seung-Soo Woo, Seoul; Je-Wung Lee, Bucheon-si; Joon-Hee Han, Suwon-si; Nam-Il Kim, Seoul, all of Rep. of Korea

[73] Assignee: SKC Limited, Kyungki-do, Rep. of Korea

[21] Appl. No.: 407,458

[22] Filed: Mar. 20, 1995

[30] Foreign Application Priority Data

| Mar. 22, 1994 | [KR] | Rep. of Korea | 94-5732 |
| Mar. 22, 1994 | [KR] | Rep. of Korea | 94-5733 |
| Mar. 22, 1994 | [KR] | Rep. of Korea | 94-5734 |
| Mar. 22, 1994 | [KR] | Rep. of Korea | 94-5736 |
| Mar. 22, 1994 | [KR] | Rep. of Korea | 94-5738 |
| Mar. 22, 1994 | [KR] | Rep. of Korea | 94-5739 |
| Jul. 2, 1994  | [KR] | Rep. of Korea | 94-15845 |
| Jul. 20, 1994 | [KR] | Rep. of Korea | 94-17522 |

[51] Int. Cl.$^6$ ................................................. B32B 5/16
[52] U.S. Cl. .................. 428/328; 428/329; 428/330; 428/331; 428/332; 428/480; 428/483; 428/910
[58] Field of Search ................................ 428/480, 483, 428/328, 329, 330, 331, 323, 327, 910, 332, 409; 524/437, 438, 492, 493, 599, 601, 605, 650, 779, 786, 788, 789, 796

[56] References Cited

U.S. PATENT DOCUMENTS

| 4,880,700 | 11/1989 | Charmot et al. | 428/337 |
| 5,096,773 | 3/1992  | Sakamoto       | 428/323 |
| 5,279,881 | 1/1994  | Kotani         | 428/141 |
| 5,429,855 | 7/1995  | Kotani et al.  | 428/141 |

*Primary Examiner*—Hoa T. Le
*Attorney, Agent, or Firm*—Anderson, Kill & Olick P.C.

[57] ABSTRACT

The present invention relates to a biaxially oriented polyester film comprising the inorganic particulate slip agent of aluminum hydroxide or $\Theta$-alumina having an average diameter ranging from 0.1005 to 3 μm and Mohs hardness of 6 or more, in an amount ranging from 0.01 to 4 wt % based on the weight of the polyester, which has improved surface properties, abrasion resistance and scratch resistance.

7 Claims, No Drawings

BIAXIALLY ORIENTED POLYESTER FILM CONTAINING AN ALUMINUM HYDRATE

FIELD OF THE INVENTION

The present invention relates to a polyester film and, more particularly, to a biaxially oriented polyester film having improved surface properties, abrasion resistance and scratch resistance.

BACKGROUND OF THE INVENTION

In general, polyesters such as polyethylene terephthalate are known to possess a good chemical stability, physical and mechanical strength, heat resistance, chemical resistance, weather resistance and electrical insulation property; and, therefore, have been widely used in manufacturing various articles including condensers, photographic films, packaging and labelling materials, and magnetic recording media. Particularly, in order for the polyester film to be suitable for use in preparing the magnetic recording media, it is required to have excellent runnability, scratch resistance and abrasion resistance.

In general, to prepare such a recording media quality polyester film, inorganic slip agents such as calcium carbonate, silica and alumina have been incorporated into the polyester film to form minute protuberances on the surface thereof, thereby reducing the area of contact between the film surface and, e.g., guide rolls in a video cassette recorder.

Among these inorganic slip agents, calcium carbonate of calcite structure are known to be capable of controlling surface properties of the film; however, they have a low affinity to polyester and low hardness, which may lead to the formation of voids during a drawing process of the film. In a further processing of the film, such voids may cause abrasion of the surface, separation of the particles and scratching of the film.

To ameliorate such problems, it has been proposed to employ alumina or silica mixed with a calcium carbonate of calcite structure as the slip agent. For instance, Japanese Patent Laid-open Publication No. Hei 2-214734 discloses a method for improving surface properties and abrasion resistance of a polyester film by incorporating $\alpha$-, $\gamma$- or $\delta$-alumina and calcium carbonate of calcite structure into the polyester film.

Similarly, Japanese Patent Laid-open Publication No. Sho 64-48836 offers a polyester film having an improved scratch resistance, in which inert particles such as colloidal silica(A) and synthetic calcium carbonate(B) having a diameter not less than that of (A) are incorporated and the height of the protuberances on the surface thereof due to (A) is lower than that attributable to (B).

Recently, certain organic particle having a good affinity to polyethylene terephthalate, a mixture of two or more inorganic particles, or a mixture of organic and inorganic particles have been employed to control the shape of the protuberances on the surface of the film to obtain improved surface properties. For instance, U.S. Pat. No. 4,761,327 discloses a method for improving scratch resistance of a film by incorporating therein organic particles such as silicon together with an inorganic slip agent, thereby increasing the affinity of the inorganic particles to polyethylene terephthalate.

However, even though these prior art methods may improve surface properties, scratch resistance and abrasion resistance of a polyester film to a certain degree, there has still existed a need for a polyester film with more enhanced physical and chemical properties.

SUMMARY OF THE INVENTION

Accordingly, it is an object of the present invention to provide a polyester film having improved surface properties, scratch resistance and abrasion resistance.

In accordance with the present invention, there is provided a biaxially oriented polyester film comprising an inorganic particulate slip agent of aluminum hydroxide or $\Theta$-alumina having an average diameter ranging from 0.005 to 3 $\mu$m and a Mohs hardness of 6 or more in an amount ranging from 0.01 to 4 wt % based on the weight of the total polyester.

DETAILED DESCRIPTION OF THE INVENTION

Among various aluminas, $\Theta$-alumina having a monoclinic system can be Used for the preparation of a slurry having a low viscosity. Since such a slurry has a good stability, a polyester film with improved surface properties, abrasion resistance and scratch resistance may be prepared by adding to the polyester a $\Theta$-alumina, especially having an average diameter ranging from 0.005 to 3 $\mu$m and a Mohs hardness of 6 or more.

Similar results may be obtained when an aluminum hydroxide having the same average diameter and hardness range as above is used instead of the $\Theta$-alumina.

Exemplary aluminum hydroxides may include $\alpha$-aluminum trihydrate, $\beta$-aluminum trihydrate, $\alpha$-aluminum monohydrate, $\beta$-aluminum monohydrate and a mixture thereof.

Preferably, a calcite-type calcium carbonate having an average diameter ranging from 0.01 to 3 $\mu$m alone or together with a spherical silica having an average diameter ranging from 0.1 to 1 $\mu$m may be employed in addition to the $\Theta$-alumina or aluminum hydroxide. Each of the calcite-type calcium carbonate and the spherical silica may be used in an amount ranging form 0.01 to 4 wt %, based on the weight of the polyester.

Further, in addition to the inorganic slip agent(s) of the calcium carbonate with or without the silica, a benzoguamine-melamine-formaldehyde condensate with an average diameter ranging from 0.1 to 5 $\mu$m may be employed as an organic slip agent to increase the affinity of the inorganic slip agent(s) to polyester, thereby improving the surface properties, abrasion resistance, and scratch resistance of the polyester film.

On the other hand, one surface of the film may be preferably treated with water-dispersible polymers, such as polyester resin, acrylic resin and a mixture thereof, to improve its adhesiveness to a magnetic substance as well as its surface properties, abrasion resistance and scratch resistance. The treatment may be conducted by a conventional method well known to persons skilled in the art, e.g., by using an in-line coater.

In addition, a crystallization agent may be used to increase the crystallization rate, especially at a low temperature, of polyester to form small and uniform sized polyester crystals, which makes the surface of the polyester film smooth and lowers the coefficient of running friction. A representative example of the crystallization agent may be 1,5-naphthalene disodium sulfonate.

The polyester film of the present invention may be prepared as follows:

The polyester which can be employed in the present invention may comprise at least 80 mol % of polyethylene terephthalate unit prepared by polycondensating dimethyl terephthalate and ethylene glycol. Either homopolyester or copolyester may be used.

Representative copolymer components for the copolyester may include dicarboxylic acids such as isophthalic acid, p-betaoxyethoxybenzoic acid, 2,6-naphthalenedicarboxylic acid, 4,4'-dicarboxyldiphenyl, 4,4'-dicarboxyl benzophenone, bis(4-carboxyldiphenyl)ethane, adipic acid, sebacic acid and 5-sodium sulfoisophthalic acid, and propylene glycol, butanediol, neopentyl glycol, diethylene glycol and cyclohexane dimethanol, and oxycarboxylic acids such as p-oxybenzoic acid.

The polyester of the present invention may be prepared by a transesterification or direct polymerization process in a batch or continuous system.

In case that the polyester is prepared by using a transesterification process, there may be preferably employed any transesterification catalysts well known in the art, for example, alkaline earth metal compounds such as magnesium, calcium, potassium and barium compounds, and cobalt, sodium, zirconium, zinc and manganese compounds. Among them, a catalyst which is soluble in the reaction system may be selected.

On the other hand, in case of employing a direct polymerization process, a catalyst, preferably, an antimony, germanium or titanium compound, may be used.

The $\Theta$-alumina or aluminum hydroxide which is used as an inert inorganic slip agent has an average diameter ranging from 0.005 to 3 μm, preferably 0.01 to 1.5 μm, and at least 6 of Mohs hardness; and it is used in an amount ranging from 0.01 to 4 wt %, preferably from 0.05 to 2 wt %, based on the weight of the polyester.

The calcium carbonate of calcite structure which may be added as another inorganic slip agent has an average diameter ranging from 0.01 to 3 μm, preferably 0.2 to 2 μm; and it is employed in an amount ranging from 0.01 to 4 wt %, preferably 0.05 to 2 wt %, based on the weight of the polyester. And, the spherical silica which may be employed as a further inorganic slip agent in addition to the calcium carbonate of calcite structure has an average diameter ranging from 0.1 to 1 μm, preferably 0.15 to 0.7 μm; and it is used in an amount ranging from 0.01 to 4 wt %, preferably 0.05 to 2 wt %.

In addition, a crystallization agent, for instance, 1,5-naphthalene disodium sulfonate, may be employed in an amount ranging from 0.05 to 5.0 wt %, preferably 0.1 to 2.0 wt %, based on the polyester.

Preferably, the organic particles of benzoguamine-melamine-formaldehyde condensate may be incorporated, together with inorganic particles of calcium carbonate and silica, into the polyester film in addition to the $\Theta$-alumina or aluminum hydroxide. In this case, the calcium carbonate may have an average diameter ranging from 0.05 to 3 μm, preferably 0.1 to 2 μm, and be employed in an amount ranging from 0.01 to 0.5 wt %, preferably 0.2 to 0.45 wt %, based on the weight of the polyester; the spherical silica may have an average diameter ranging from 0.05 to 3 μm, preferably 0.1 to 2.0 μm, and be employed in an amount ranging from 0.01 to 0.5 wt %, preferably 0.1 to 0.3 wt %, based on the polyester; and the benzoguamine-melamine-formaldehyde condensate may have an average diameter ranging from 0.1 to 5 μm, preferably 0.5 to 4 μm, and be used in an amount ranging from 0.01 to 0.5 wt %, preferably 0.05 to 0.2 wt, based on the polyester.

The slip agents such as $\Theta$-alumina, aluminum hydroxide, calcium carbonate of calcite structure and spherical silica which may be employed in the present invention may be added into an ethylene glycol slurry together with a dispersant. Representative dispersants may include acrylic compounds such as sodium polyacrylate, sodium metacrylic acid and ammonium acrylic acid, and benzene sulfonate compounds, which are soluble in ethylene glycol. The ethylene glycol slurry comprising the slip agents is then polycondensed with dimethyl terephthalate to produce a polyester.

The polyester film in accordance with the present invention may be prepared by employing any conventional method, for example, by melt-extruding a polyester of molecular weight of about 20,000 containing the above-described inorganic slip agents with/without an organic slip agent as well as conventional additives into a cast film through T-die.

This film is subsequently quenched on a cold roll, then biaxially drawn to produce a biaxially oriented polyester film. The drawing process may be conducted at a temperature ranging from 60° to 150° C; and the draw ratio may range from 2.5 to 6.0 in either a longitudinal direction or a transverse direction.

The thickness of the polyester film produced as described above may be controlled depending on the usage; and it is usually in the range from 2.0 to 200 μm.

The following Examples are intended to illustrate the present invention more specifically, without limiting the scope of the invention.

In the Examples, the average particle diameter-, viscosity, molecular weight, surface smoothness, abrasion resistance, scratch resistance, adhesiveness and coefficient of running friction were measured in accordance with the following Reference Examples.

REFERENCE EXAMPLE 1

Average Particle Diameter

The average particle diameter of the organic or inorganic slip agent particles was measured as a volumetric average diameter of an ethylene glycol slurry containing the slip agents by employing a centrifugation type granulometer(SA-CP2, Shimadzu in Japan).

REFERENCE EXAMPLE 2

Viscosity

The viscosity of a slurry was measured at a spindle speed of 60 rpm by employing B type viscosimeter(Brookfield in England) at room temperature.

REFERENCE EXAMPLE 3

Molecular Weight

The molecular weight of a polymer was measured by way of a molecular weight measuring apparatus(150C, Waters in U.S.A.) by using metacresol as a mobile phase at a flow rate of 1 ml/min. and at a column temperature of 100° C.

REFERENCE EXAMPLE

Surface Smoothness

The surface smoothness of a 30 mm ×20 mm ×50 μm polyester film was determined by using a contact type surface roughness gauge(SURFCORDER SE-30D, Kosaka Institute in Japan).

Average Surface Roughness at Centerline(Ra):

The height of a line parallel to a mean line of a roughness curve, when the areas of both sides of the line become equal.

Highest Height at Centerline(Rt):

Distance from the highest point to the lowest point within the measuring area.

REFERENCE EXAMPLE 5

Abrasion Resistance

The abrasion resistance of a film was determined by running a tape, which was made by slitting the film in a width of ½ inch, at a running speed of 3.3 cm/sec. twice by way of a tape running tester(TBT-300F, Yokohama System Institute in Japan), and observing the degree of the formation of white powder at the surface of the guide pin with a microscope.

The abrasion resistance was evaluated on the basis of the following criteria:

⊚: When no white powder was formed on the surface of the guide pin.
o: When white powders were formed on 20% of the surface of the guide pin.
Δ: When white powders were formed on 50% of the surface of the guide pin.
X : When white powders were formed on the entire surface of the guide pin.

REFERENCE EXAMPLE 6

Scratch Resistance

The scratch resistance of a film was determined by running a tape, which was made by slitting the film in a width of ½ in., at a running speed of 3.3 cm/sec. twice by way of a tape running tester(TBT-300F, Yokohama System Institute in Japan), and observing the degree of the formation of scratch around the surface of the film with a microscope.

The scratch resistance was evaluated on the basis of the following criteria:

⊚: When less than 2 scratch lines were formed around the tape.
o: When 3 to 4 scratch lines were formed around the tape.
Δ: When 5 to 6 scratch lines were formed around the tape.
X : When more than 7 scratch lines were formed around the tape.

REFERENCE EXAMPLE 7

Adhesiveness

A polyester tape made by slitting a polyester film in a width of ½ inch and a length of 15 cm was adhered to a tape adhesiveness tester(Peeling Tester, Heidon in Japan) and the peeling force of the tape was determined.

⊚: More than 600 g of peeling force
o: 300 to 600 g of peeling force
Δ: 100 to 300 g of peeling force
X: Less than 100 g of peeling force

REFERENCE EXAMPLE 8

Coefficient of Running Friction

The coefficient of running friction was measured by employing a runnability tester(TBT-300F, Yokohama System Institute in Japan) as follows. A film slitted to a width of ½ inch was moved through a fixed guide pin(material: SUS303) at a speed of 3.3 cm/sec. and a contact angle of 130°. The tension Ti at the inlet is adjusted to 30 g.cm and the outlet tension To is detected after the film has travelled 90 m.

The coefficient of running friction(μk) was calculated in accordance with the following equation:

$$\mu k = [2.303/\Theta] \times \log[Ti/To]$$

Θ(radian): Contact angle between a film and a guide pin
Ti and To: Inlet tension and outlet tension, respectively

Example 1

Dimethyl terephthalate and ethylene glycol were reacted in the presence of 0.25 wt % of Θ-alumina with an average diameter of 0.20 μm to prepare a polyethylene terephthalate("PET") having a molecular weight of about 20,000 by a conventional polycondensation process. The polymer was melt-extruded through a T-die to form an unextended sheet. The sheet was extended in a draw ratio of 3.0 in longitudinal and transverse directions at 90° C. to provide a biaxially oriented film having the thickness of 50 μm. The physical properties of the film were measured and the results are given in Table 1.

EXAMPLES 1-2 to 1-4

The procedures described in Example 1—1 were repeated except that the Θ-alumina was added as specified in Table 1. The results are given in Table 1.

COMPARATIVE EXAMPLES 1—1 to 1-9

The procedures described in Example 1—1 were repeated except that calcium carbonate of calcite structure, γ-and δ-alumina specified in Table 1 were employed in each of Comparative Examples, instead of the Θ-alumina. The results are given in Table 1.

TABLE 1

| | Slip Agent | | | Properties of the Film | | | | | |
| --- | --- | --- | --- | --- | --- | --- | --- | --- | --- |
| | | Average Diameter (μm) | Amount (%) | *Alumina Viscosity (cps) | Number Average Molecular Weight (Mn) | Surface Smoothness | | Abrasion Resistance | Scratch Resistance |
| | | | | | | Ra(μm) | Rt(μm) | | |
| Ex. | | | | | | | | | |
| 1-1 | θ-Alumina | 0.20 | 0.25 | 250 | 18,100 | 0.021 | 0.245 | ⊚ | ⊚ |
| 1-2 | θ-Alumina | 0.20 | 0.20 | 250 | 18,300 | 0.018 | 0.255 | ⊚ | ⊚ |
| 1-3 | θ-Alumina | 0.35 | 0.15 | 250 | 18,900 | 0.025 | 0.272 | ⊚ | ⊚ |
| 1-4 | θ-Alumina | 0.35 | 0.10 | 250 | 19,900 | 0.023 | 0.268 | ⊚ | ⊚ |
| Comp. Ex. | | | | | | | | | |
| 1-1 | Calium Carbonate of Calcite sulfate | 0.40 | 0.30 | — | 16,600 | 0.049 | 0.598 | x | x |
| 1-2 | Calcite-type Calcium Carbonate | 0.54 | 0.20 | — | 17,600 | 0.053 | 0.757 | x | x |
| 1-3 | Calcite-type Calcium Carbonate | 0.65 | 0.15 | — | 18,300 | 0.063 | 0.815 | x | x |
| 1-4 | γ-Alumina | 0.10 | 0.25 | 1500 | 17,800 | 0.046 | 0.754 | x | Δ |
| 1-5 | γ-Alumina | 0.20 | 0.20 | 1500 | 17,300 | 0.054 | 0.796 | Δ | Δ |
| 1-6 | δ-Alumina | 0.30 | 0.15 | 510 | 18,500 | 0.069 | 0.887 | x | Δ |
| 1-7 | Calcite-type Calcium Carbonate/ γ-Alumina | 0.40 0.10 | 0.30 0.25 | — 1500 | 19,100 | 0.053 | 0.620 | x | Δ |
| 1-8 | Calcite-type Calcium Carbonate/ γ-Alumina | 0.54 0.20 | 0.20 0.20 | — 1500 | 19,300 | 0.063 | 0.780 | O | O |
| 1-9 | Calcite-type Calcium Carbonate/ γ-Alumina | 0.65 0.30 | 0.15 0.15 | — 1500 | 18,100 | 0.069 | 1.262 | X | O |

*Viscosity of 20 wt % slurry

As shown in Table 1, the slurry prepared with Θ-alumina exhibits low viscosity; and, the films prepared with the slurry containing Θ-alumina have better surface smoothness, and especially, excellent abrasion resistance and scratch resistance compared with other films not containing Θ-alumina.

EXAMPLES 2-1 to 2-4

The procedures described in Example 1—1 were repeated except that calcium carbonate of calcite structure and Θ-alumina were added as specified in Table 2. The results are given in Table 2.

COMPARATIVE EXAMPLE 2-1 to 2-9

The procedures described in Example 2-1 were repeated except that calcium carbonate of calcite structure, and/or γ-or δ-alumina was added as specified in Table 2. The results are given in Table 2.

TABLE 2

| | Slip Agent | | | Properties of the Film | | | | | |
| --- | --- | --- | --- | --- | --- | --- | --- | --- | --- |
| | | Average Diameter (μm) | Amount (%) | *Alumina Viscosity (cps) | Number Average Molecular Weight (Mn) | Surface Smoothness | | Abrasion Resistance | Scratch Resistance |
| | | | | | | Ra(μm) | Rt(μm) | | |
| Ex. | | | | | | | | | |
| 2-1 | Calcium | 0.42 | 0.30 | — | 18,000 | 0.044 | 0.555 | ⊚ | ⊚ |

TABLE 2-continued

| | Slip Agent | | | Properties of the Film | | | | |
|---|---|---|---|---|---|---|---|---|
| | | Average Diameter (μm) | Amount (%) | *Alumina Viscosity (cps) | Number Average Molecular Weight (Mn) | Surface Smoothness | | Abrasion Resistance | Scratch Resistance |
| | | | | | | Ra(μm) | Rt(μm) | | |
| | Carbonate of Calcite Structure | 0.20 | 0.25 | 250 | | | | | |
| 2-2 | Calcium Carbonate of Calcite Structure | 0.53 0.20 | 0.20 0.20 | — 250 | 18,400 | 0.047 | 0.677 | ⊙ | ⊙ |
| 2-3 | Calcium Carbonate of Calcite Structure | 0.60 0.35 | 0.15 0.15 | — 250 | 18,800 | 0.050 | 1.113 | ⊙ | ⊙ |
| 2-4 | Calcium Carbonate of Calcite Structure | 1.40 0.35 | 0.10 0.10 | — 250 | 17,900 | 0.063 | 1.333 | ⊙ | ⊙ |
| Comp. Ex. | | | | | | | | | |
| 2-1 | Calcite-type Calcium Carbonate | 0.40 | 0.30 | — | 16,600 | 0.049 | 0.598 | x | x |
| 2-2 | Calcite-type Calcium Carbonate | 0.54 | 0.20 | — | 17,600 | 0.053 | 0.757 | x | x |
| 2-3 | Calcite-type Calcium Carbonate | 0.65 | 0.15 | — | 18,300 | 0.063 | 0.815 | x | x |
| 2-4 | γ-Alumina | 0.10 | 0.25 | 1500 | 17,800 | 0.046 | 0.754 | x | Δ |
| 2-5 | γ-Alumina | 0.20 | 0.20 | 1500 | 17,300 | 0.054 | 0.796 | Δ | Δ |
| 2-6 | δ-Alumina | 0.30 | 0.15 | 510 | 18,500 | 0.069 | 0.887 | x | Δ |
| 2-7 | Calcite-type Calcium Carbonate/ γ-Alumina | 0.40 0.10 | 0.30 0.25 | — 1500 | 19,100 | 0.053 | 0.620 | x | Δ |
| 2-8 | Calcite-type Calcium Carbonate/ γ-Alumina | 0.54 0.20 | 0.20 0.20 | — 1500 | 19,300 | 0.063 | 0.780 | ○ | ○ |
| 2-9 | Calcite-type Calcium Carbonate/ γ-Alumina | 0.65 0.30 | 0.15 0.15 | — 1500 | 18,100 | 0.069 | 1.262 | x | ○ |

As shown in Table 2, the slurry containing Θ-alumina exhibits low viscosity; and, the films prepared with the slurry containing Θ-alumina and calcium carbonate of calcite structure have better surface smoothness and especially, excellent abrasion resistance and scratch resistance compared with other films including γ-or δ-alumina and/or calcite-type calcium carbonate.

EXAMPLES 3-1 to 3-4

The procedures described in Example 1—1 were repeated except that calcite-type calcium carbonate, spherical silica and Θ-alumina were added as specified in Table 3. The results are given in Table 3.

COMPARATIVE EXAMPLES 3-1 to 3-9

The procedures described in Example 3-1 were repeated except that calcite-type calcium carbonate, spherical silica, and/or γ-or δ-alumina was added as specified in Table 3. The results are given in Table 3.

TABLE 3

| | Slip Agent | | | Properties of the Film | | | | |
|---|---|---|---|---|---|---|---|---|
| | | | | Number Average | Surface Smoothness | | | |
| | Average Diameter (μm) | Amount (%) | *Alumina Viscosity (cps) | Molecular Weight (Mn) | Ra(μm) | Rt(μm) | Abrasion Resistance | Scratch Resistance |
| Ex. | | | | | | | | |
| 3-1 | Calcite-type Calcium Carbonate/ | 0.42 | 0.30 | — | 18,100 | 0.042 | 0.548 | ⊚ | ⊚ |
| | Spherical Silica/ | 0.28 | 0.25 | — | | | | | |
| | θ-Alumina | 0.20 | 0.15 | 250 | | | | | |
| 3-2 | Calcite-type Calcium Carbonate/ | 0.53 | 0.20 | — | 19,200 | 0.049 | 0.723 | ⊚ | ⊚ |
| | Spherical Silica/ | 0.50 | 0.20 | — | | | | | |
| | θ-Alumina | 0.20 | 0.20 | 250 | | | | | |
| 3-3 | Calcite-type Calcium Carbonate/ | 0.60 | 0.15 | — | 19,300 | 0.053 | 1.125 | ⊚ | ⊚ |
| | Spherical Silica/ | 0.70 | 0.15 | — | | | | | |
| | θ-Alumina | 0.35 | 0.25 | 250 | | | | | |
| 3-4 | Calcite-type Calcium Carbonate/ | 1.40 | 0.10 | — | 19,700 | 0.064 | 1.337 | ⊚ | ⊚ |
| | Spherical Silica/ | 1.00 | 0.10 | — | | | | | |
| | θ-Alumina | 0.35 | 0.14 | 250 | | | | | |
| Comp. Ex. | | | | | | | | | |
| 3-1 | Calcite-type Calcium Carbonate | 0.40 | 0.30 | — | 16,600 | 0.049 | 0.598 | x | x |
| 3-2 | Calcite-type Calcium Carbonate | 0.54 | 0.20 | — | 17,600 | 0.053 | 0.757 | x | x |
| 3-3 | Calcite-type Calcium Carbonate | 0.65 | 0.15 | — | 18,300 | 0.063 | 0.815 | x | x |
| 3-4 | γ-Alumina | 0.10 | 0.25 | 1500 | 17,800 | 0.046 | 0.754 | x | Δ |
| 3-5 | γ-Alumina | 0.20 | 0.20 | 1500 | 17,300 | 0.054 | 0.796 | Δ | Δ |
| 3-6 | δ-Alumina | 0.30 | 0.15 | 510 | 18,500 | 0.069 | 0.887 | x | Δ |
| 3-7 | Calcite-type Calcium Carbonate/ | 0.40 | 0.30 | — | 19,100 | 0.053 | 0.620 | x | Δ |
| | γ-Alumina | 0.10 | 0.25 | 1500 | | | | | |
| 3-8 | Calcite-type Calcium Carbonate/ | 0.54 | 0.20 | — | 19,300 | 0.063 | 0.780 | ○ | ○ |
| | γ-Alumina | 0.20 | 0.20 | 1500 | | | | | |
| 3-9 | Calcite-type Calcium Carbonate/ | 0.65 | 0.15 | — | 18,100 | 0.069 | 1.262 | x | ○ |
| | γ-Alumina | 0.30 | 0.15 | — | | | | | |

As shown in Table 3, the slurry containing Θ-alumina exhibits low viscosity; and, the films prepared with the slurry containing Θ-alumina, calcite-type calcium carbonate and spherical silica have better surface smoothness and especially, excellent abrasion resistance and scratch resistance compared with other films not containing Θ-alumina.

EXAMPLES 4-1 to 4—4

The procedures described in Example 1—1 were repeated except that aft aluminum hydroxide was added as specified in Table 4, instead of ⊕-alumina. The results are given in Table 4.

COMPARATIVE EXAMPLES 4-1 to 4-9

The procedures described in Example 4-1 were repeated except that a conventional slip agent was added as specified in Table 4. The results are given in Table 4.

TABLE 4

| | Slip Agent | | Properties of the Film | Surface Smoothness | | | |
|---|---|---|---|---|---|---|---|
| | | | Molecular Weight Number | Average Surface Roughness | Highest Height | Abrasion Resistance | Scratch Resistance |
| | Average Diameter (μm) | Amount (%) | Average Molecular Weight(Mn) | at Centerline (Ra:μm) | at Centerline (Rt:μm) | | |
| Ex. | | | | | | | |
| 4-1 | α-aluminum trihydrate | 0.10 | 0.25 | 18,800 | 0.15 | 0.220 | ⊙ | ⊙ |
| 4-2 | β-aluminum trihydrate | 0.10 | 0.15 | 19,500 | 0.013 | 0.157 | ⊙ | ⊙ |
| 4-3 | α-aluminum monohydrate | 0.30 | 0.15 | 19,200 | 0.018 | 0.259 | ⊙ | ⊙ |
| 4-4 | β-aluminum monohydrate | 0.30 | 0.10 | 18,900 | 0.017 | 0.235 | o | ⊙ |
| Comp. Ex. | | | | | | | |
| 4-1 | Calcite-type Calcium Carbonate | 0.40 | 0.30 | 16,600 | 0.049 | 0.598 | x | x |
| 4-2 | Calcite-type Calcium Carbonate | 0.54 | 0.20 | 17,600 | 0.053 | 0.757 | x | x |
| 4-3 | Calcite-type Calcium Carbonate | 0.65 | 0.15 | 18,300 | 0.063 | 0.815 | x | x |
| 4-4 | γ-alumina | 0.10 | 0.25 | 17,800 | 0.046 | 0.754 | x | Δ |
| 4-5 | γ-alumina | 0.20 | 0.20 | 17,300 | 0.054 | 0.796 | Δ | Δ |
| 4-6 | δ-alumina | 0.30 | 0.15 | 18,500 | 0.069 | 0.887 | x | Δ |
| 4-7 | Calcite-type Calcium Carbonate/γ-alumina | 0.40/0.10 | 0.30/0.25 | 19,100 | 0.053 | 0.620 | x | Δ |
| 4-8 | Calcite-type Calcium Carbonate/γ-alumina | 0.54/0.20 | 0.20/0.20 | 19,300 | 0.063 | 0.780 | x | o |
| 4-9 | Calcite-type Calcium Carbonate/γ-alumina | 0.65/0.30 | 0.15/0.15 | 18,100 | 0.069 | 1.262 | x | o |

As shown in Table 4, the polyester films prepared with the slurry containing the slip agent in accordance with the present invention exhibit excellent surface properties compared with other polyester films prepared with the slurry not containing aluminum hydroxide.

EXAMPLES 5-1 to 5-4

The procedures described in Example 1—1 were repeated except that calcite-type calcium carbonate and aluminum hydroxide were added as specified in Table 5. The results are given in Table 5.

COMPARATIVE EXAMPLES 5-1 to 5-9

The procedures described in Example 5-1 were repeated except that a conventional slip agent was added as specified in Table 5. The results are given in Table 5.

TABLE 5

| | Slip Agent | | Molecular Weight Number | Properties of the Film | | | |
|---|---|---|---|---|---|---|---|
| | | | | Surface Smoothness | | | |
| | | | | Average Surface Roughness | Highest Height | Abra- | |
| | Average Diameter (μm) | Amount (%) | Average Molecular Weight(Mn) | at Centerline (Ra:μm) | at Centerline (Rt:μm) | sion Resistance | Scratch Resistance |
| Ex. | | | | | | | |
| 5-1 | Calcite-type Calcium Carbonate/ α-aluminum trihydrate | 0.42/0.10 | 0.30/0.25 | 18,200 | 0.040 | 0.550 | ⊙ | ⊙ |
| 5-2 | Calcite-type Calcium Carbonate/ β-aluminum trihydrate | 0.60/0.10 | 0.15/0.15 | 19,600 | 0.051 | 1.116 | ⊙ | ⊙ |
| 5-3 | Calcite-type Calcium Carbonate/ α-aluminum monohydrate | 0.60/0.30 | 0.15/0.15 | 19,500 | 0.052 | 1.110 | ⊙ | ⊙ |
| 5-4 | Calcite-type Calcium Carbonate/ β-aluminum monohydrate | 1.40/0.30 | 0.10/0.10 | 18,700 | 0.067 | 1.320 | ○ | ⊙ |
| Comp. Ex. | | | | | | | | |
| 5-1 | Calcite-type Calcium Carbonate | 0.40 | 0.30 | 16,600 | 0.049 | 0.598 | x | x |
| 5-2 | Calcite-type Calcium Carbonate | 0.54 | 0.20 | 17,600 | 0.053 | 0.757 | x | x |
| 5-3 | Calcite-type Calcium Carbonate | 0.65 | 0.15 | 18,300 | 0.063 | 0.815 | x | x |
| 5-4 | γ-alumina | 0.10 | 0.25 | 17,800 | 0.046 | 0.754 | x | Δ |
| 5-5 | γ-alumina | 0.20 | 0.20 | 17,300 | 0.054 | 0.796 | Δ | Δ |
| 5-6 | δ-alumina | 0.30 | 0.15 | 18,500 | 0.069 | 0.887 | x | Δ |
| 5-7 | Calcite-type Calcium Carbonate/ γ-alumina | 0.40/0.10 | 0.30/0.25 | 19,100 | 0.053 | 0.620 | x | Δ |
| 5-8 | Calcite-type Calcium Carbonate/ γ-alumina | 0.54/0.20 | 0.20/0.20 | 19,300 | 0.063 | 0.780 | x | ○ |
| 5-9 | Calcite-type Calcium Carbonate/ γ-alumina | 0.65/0.30 | 0.15/0.15 | 18,100 | 0.069 | 1.262 | x | ○ |

As shown in Table 5, the polyester films prepared with the slurry including aluminum hydroxide and calcite-type calcium carbonate exhibit excellent surface properties compared with other polyester films prepared from the slurry including conventional slip agents.

EXAMPLES 6-1 to 6-3

The procedures described in Example 1—1 were repeated except that calcite-type calcium carbonate, spherical silica and aluminum hydroxide were added as specified in Table 6.

Thereafter, one surface of the polyester film was treated with the polymer as specified in Table 6. The results are given in Table 6.

COMPARATIVE EXAMPLES 6-1 to 6-9

The procedures described in Example 6-1 were repeated except that a conventional slip agent was added as specified in Table 6, and the polyester film was not treated. The results are given in Table 6.

TABLE 6

| | Inorganic Agent | | | | Properties of the Film | | | | | |
|---|---|---|---|---|---|---|---|---|---|---|
| | | | | | | Surface Smoothness | | | | |
| | | Average Diameter (μm) | Amount (wt %) | Surface Treatment | Mol. Weight Number Aver. Mol. Weight (Mn) | Aver. Surf. Roughness at Center line(Ra: μm) | Highest Height at Center line(Rt: μm) | Abrasion Resistance | Adhesiveness | Scratch Resistance |
| Ex. | | | | | | | | | | |
| 6-1 | Calcite-type Calcium Carbonate/ Spherical Silica/ β-aluminum trihydrate | 0.53/ 0.50/ 0.10 0.10 | 0.20/ 0.20/ 0.20 0.20 | Polyesters | 19,000 | 0.045 | 0.730 | ⊙ | ⊙ | ⊙ |
| 6-2 | Calcite-type Calcium Carbonate/ β-aluminum trihydrate | 0.60/0.1 0 | 0.15/0.1 5 | Polyesters | 19,600 | 0.051 | 1.116 | ⊙ | ⊙ | ⊙ |
| 6-3 | Calcite-type Calcium Carbonate/ Spherical Silica/ β-aluminum monohydrate | 1.40/ 1.00/ 0.30 | 0.10/ 0.10/ 0.14 | Acryl-Polyesters | 18,700 | 0.067 | 1.320 | ○ | ⊙ | ⊙ |
| Com. Ex. | | | | | | | | | | |
| 6-1 | Calcite-type Calcium Carbonate | 0.40 | 0.30 | — | 16,600 | 0.049 | 0.598 | X | X | X |
| 6-2 | Calcite-type Calcium Carbonate | 0.54 | 0.20 | — | 17,600 | 0.053 | 0.757 | X | X | X |
| 6-3 | Calcite-type Calcium Carbonate | 0.65 | 0.15 | — | 18,300 | 0.063 | 0.815 | X | X | X |
| 6-4 | γ-alumina | 0.10 | 0.25 | — | 17,800 | 0.046 | 0.754 | X | X | Δ |
| 6-5 | γ-alumina | 0.20 | 0.20 | — | 17,300 | 0.054 | 0.796 | Δ | Δ | Δ |
| 6-6 | δ-alumina | 0.30 | 0.15 | — | 18,500 | 0.069 | 0.887 | X | X | Δ |
| 6-7 | Calcite-type Calcium Carbonate/ γ-alumina | 0.40/ 0.10 | 0.30/ 0.25 | — | 19,100 | 0.053 | 0.620 | X | X | Δ |
| 6-8 | Calcite-type Calcium Carbonate/ γ-alumina | 0.54/ 0.20 | 0.20/ 0.20 | — | 19,300 | 0.063 | 0.780 | X | X | ○ |
| 6-9 | Calcite-type Calcium Carbonate/ Spherical Silica | 0.65/ 0.30 | 0.15/ 0.15 | — | 18,400 | 0.068 | 1.255 | X | X | ○ |

As shown in Table 6, the polyester films prepared with the slurry containing calcite-type calcium carbonate, spherical silica and aluminum hydroxide exhibit excellent surface properties compared with other polyester films prepared with the slurry containing conventional slip agents.

EXAMPLE 7-1

To a mixture of 1000 g of dimethylterephthalate and 640 g of ethylene glycol were added 0.04 wt % of zinc acetate and 0.02 wt % of calcium acetate, based on the weight of the polyester, in an ethylene glycol slurry as a transesterification catalyst; and, 0.15 wt % of calcite-type calcium carbonate, based on the weight of the polyester, in an ethylene glycol slurry was added thereto. At the end of the esterification process, 0.10 wt % of alumina, based on the polyester, in an ethylene glycol slurry was added to the reaction mixture, and 0.10 wt % of 1,5-naphthalene disodium sulfonate in another ethylene glycol slurry as a crystallization agent was added thereto; and, the transesterification process was carried out. The resulting transesterification product was polycondensed in the presence of 0.015 wt % of phosphoric acid as a thermal stabilizer and 0.045 wt % of antimony trioxide as a polymerization catalyst under vacuum to obtain polyester.

The polyester was melt-extruded through a T-Die to form an unextended sheet. The sheet was extended in longitudinal direction at a temperature of 80° to 90° C. which is a somewhat higher temperature than Tg of the polyester in a draw ratio from 3.5 to 4; and subsequently, extended in transverse direction at a temperature of 100° to 150° C. in a draw ratio from 3.5 to 4. If necessary, the biaxially oriented film may be heat-treated at 180° to 230° C.

EXAMPLE 7-2 to 7-5

The procedures described in Example 7-1 were repeated except that calcite-type calcium carbonate, alumina and 1,5-naphthalene disodium sulfonate were added as specified in Table 7. The results are given in Table 7.

COMPARATIVE EXAMPLES 7-1 to 7-2

The procedures described in Example 7-1 were repeated except that calcite-type calcium carbonate and alumina were added as specified in Table 7, and 1,5-naphthalene disodium sulfonate was not added. The results are given in Table 7.

COMPARATIVE EXAMPLES 7-3 to 7-4

The procedures described in Example 7-1 were repeated except that calcite-type calcium carbonate was added as specified in Table 7, and alumina and 1,5-naphthalene disodium sulfonate were not added. The results are given in Table 7.

COMPARATIVE EXAMPLES 7-5 to 7-6

The procedures described in Example 7-1 were repeated except that calcite-type calcium carbonate, alumina and 1,5-naphthalene disodium sulfonate were added as specified in Table 7. The results are given in Table 7.

tion in the coefficient of running friction during the running and have excellent abrasion resistance and scratch resistance.

EXAMPLES 8-1 to 8-4

Polyester with a molecular weight of about 20,000 was polycondensed with calcium carbonate and spherical silica as inorganic slip agents and benzoguamine-melamine-formaldehyde condensate as an organic slip agent as specified in Table 8. The polymer so obtained was melt-extruded to an unextended sheet by a conventional method and then extended in longitudinal direction at a draw ratio of 3.5 and in transverse direction at a draw rate of 3.0 at 90° C. to obtain a biaxially oriented polyester film with a thickness of 500 μm. The physical properties of the film were measured in accordance with Reference Examples and the results are given in Table 8.

COMPARATIVE EXAMPLES 8-1 to 8-9

The procedures described in Example 8-1 were repeated except that benzoguamine-melamine-formaldehyde condensate was not added and a mixture of calcium carbonate and spherical silica as an inorganic slip agent was added as specified in Table 8. The results are given in Table 8.

TABLE 7

| | Slip Agent(wt %) | | Crystallization Agent (wt %) | Properties of the Film | | | |
|---|---|---|---|---|---|---|---|
| | Calcium Carbonate | Alumina | | Ra(μm) | Coeffi. of Running Friction (Beg.–Mid.–End)(μm) | Abrasion Resistance | Scratch Resistance |
| Ex. 7-1 | 0.15 | 0.10 | 0.1 | 0.013 | 0.26–0.31–0.35 | ◯ | ◯ |
| Ex. 7-2 | 0.15 | 0.05 | 0.5 | 0.012 | 0.21–0.24–0.25 | ◉–◯ | ◉ |
| Ex. 7-3 | 0.15 | 0.05 | 1.5 | 0.013 | 0.22–0.22–0.23 | ◉ | ◉ |
| Ex. 7-4 | 0.25 | 0.05 | 3.0 | 0.015 | 0.23–0.28–0.33 | ◯ | ◯ |
| Ex. 7-5 | 0.25 | 0.05 | 5.0 | 0.014 | 0.22–0.25–0.31 | ◯ | ◯ |
| Com. Ex. 7-1 | 0.25 | 0.05 | — | 0.015 | 0.27–0.34–0.42 | ◯ | ◯ |
| Com. Ex. 7-2 | 0.25 | 0.01 | — | 0.013 | 0.31–0.38–0.46 | ◯–△ | △ |
| Com. Ex. 7-3 | 0.30 | — | — | 0.015 | 0.41–0.61–0.79 | △ | X |
| Com. Ex. 7-4 | 0.20 | — | — | 0.013 | 0.39–0.73–0.87 | △–X | X |
| Com. Ex. 7-5 | 0.25 | 0.01 | 0.04 | 0.013 | 0.28–0.35–0.42 | ◯ | ◯ |
| Com. Ex. 7-6 | 0.25 | 0.01 | 7.0 | 0.013 | 0.29–0.43–0.59 | △ | ◯–△ |

As shown in Table 7, the polyester films prepared with the slurry containing a crystallization agent exhibit little varia-

TABLE 8

| | Slip Agent | | Properties of the Film | | | | |
|---|---|---|---|---|---|---|---|
| | | | Number Average Molecular Weight | Surface Smoothness | | Abrasion Resistance | Scratch Resistance |
| | Average Diameter (μm) | Amount (%) | (Mn) | Ra(μm) | Rt(μm) | | |
| Ex. | | | | | | | |
| 8-1 | Calcium Carbonate/ | 0.40 | 18,100 | 0.036 | 0.535 | ⊙ | ○ |
| | Spherical Silica/ | 0.10 | | | | | |
| | | 0.50 | | | | | |
| | Organic Condensate | | | | | | |
| | | 0.25 | | | | | |
| | | 0.20 | | | | | |
| | | 0.10 | | | | | |
| 8-2 | Calcium Carbonate/ | 0.54 | 18,500 | 0.043 | 0.733 | ⊙ | ⊙ |
| | Spherical Silica/ | 0.20 | | | | | |
| | | 0.90 | | | | | |
| | Organic Condensate | | | | | | |
| | | 0.20 | | | | | |
| | | 0.15 | | | | | |
| | | 0.15 | | | | | |
| 8-3 | Calcium Carbonate/ | 0.65 | 18,300 | 0.056 | 1.062 | ⊙ | ⊙ |
| | Spherical Silica/ | 0.30 | | | | | |
| | | 1.55 | | | | | |
| | Organic Condensate | | | | | | |
| | | 0.15 | | | | | |
| | | 0.10 | | | | | |
| | | 0.20 | | | | | |
| 8-4 | Calcium Carbonate/ | 1.55 | 17,700 | 0.070 | 1.332 | ○ | ○ |
| | Spherical Silica/ | 0.40 | | | | | |
| | | 2.10 | | | | | |
| | Organic Condensate | | | | | | |
| | | 0.10 | | | | | |
| | | 0.15 | | | | | |
| | | 0.10 | | | | | |
| Comp. Ex. | | | | | | | |
| 8-1 | Calcium Carbonate | 0.40 | 0.30 | 16,600 | 0.049 | 0.598 | x | x |
| 8-2 | Calcium Carbonate | 0.54 | 0.20 | 17,600 | 0.053 | 0.757 | x | x |
| 8-3 | Calcium Carbonate | 0.65 | 0.15 | 18,300 | 0.063 | 0.815 | x | x |
| 8-4 | Spherical Silica | 0.10 | 0.25 | 17,800 | 0.046 | 0.754 | Δ | Δ |
| 8-5 | Spherical Silica | 0.20 | 0.20 | 17,300 | 0.054 | 0.796 | ○ | Δ |
| 8-6 | Spherical Silica | 0.30 | 0.15 | 18,500 | 0.069 | 0.887 | Δ | Δ |
| 8-7 | Calcium Carbonate/ Spherical Silica | 0.40 / 0.10 | 0.25 / 0.20 | 19,100 | 0.051 | 0.618 | Δ | Δ |
| 8-8 | Calcium Carbonate/ Spherical Silica | 0.54 / 0.20 | 0.20 / 0.15 | 19,300 | 0.063 | 0.780 | ○ | ○ |
| 8-9 | Calcium Carbonate/ Spherical Silica | 0.65 / 0.30 | 0.15 / 0.10 | 18,100 | 0.067 | 1.260 | Δ | ○ |

As shown in Table 8, the polyester films of Examples 8-1 to 8-4, which were prepared with the slurry including calcium carbonate, spherical silica and benzoguamine-melamine-formaldehyde condensate have excellent surface properties, abrasion resistance and scratch resistance.

In the meantime, the polyester films of Comparative Examples 8-1 to 8-9, which were prepared with the slurry including only calcium carbonate and/or silica without an organic slip agent show poor abrasion resistance and scratch resistance.

While the invention has been described in connection with the above specific embodiments, it should be recognized that various modifications and changes as may be apparent to those skilled in the art to which the invention pertains may be made and also fall within the scope of the invention as defined by the claims that follow.

What is claimed is:

1. A biaxially oriented polyester film comprising β-aluminum monohydrate having an average diameter ranging from 0.005 to 3 μm and a Mobs hardness of 6 or more in an amount ranging from 0.01 to 4 wt % based on the weight of the polyester.

2. The polyester film of claim 1, wherein one surface of the film is treated with a water-dispersible polymer selected from the group consisting of polyester resin, acrylic resin and a mixture thereof.

3. The polyester film of claim 1 further comprising a calcium carbonate of calcite structure having an average diameter ranging from 0.01 to 3 μm in an amount ranging from 0.01 to 4 wt % based on the weight of the polyester.

4. The polyester film of claim 3 further comprising spherical silica having an average diameter ranging from 0.1 to 1 μm in an amount ranging from 0.01 to 4 wt % based on the weight of the polyester.

5. The polyester film of claim 3 further comprising the crystallization agent of 1,5-naphthalene disodium sulfonate in an amount ranging from 0.1 to 2.0 wt % based on the weight of the polyester.

6. The polyester film of claim 1 further comprising a benzoguamine-melamine-formaldehyde condensate having an average diameter ranging from 0.1 to 5 μm in an amount of 0.01 to 0.5 wt % based on the weight of the polyester; and a calcium carbonate and spherical silica each having an average diameter ranging from 0.05 to 3 μm and each present in an amount ranging from 0.01 to 0.5 wt % based on the weight of the polyester.

7. The polyester film of claim 1 further comprising the crystalization agent of a 1,5-naphthalene disodium sulfonate in an amount ranging from 0.05 to 5.0 wt % based on the weight of the polyester.

* * * * *